(12) United States Patent
Turnquist et al.

(10) Patent No.: US 11,613,904 B2
(45) Date of Patent: Mar. 28, 2023

(54) PRE-FABRICATED COMPONENT FOR AN ADDITIVELY MANUFACTURED WIND TURBINE TOWER STRUCTURE

(71) Applicant: General Electric Company, Schenectady, NY (US)

(72) Inventors: Norman Arnold Turnquist, Carlisle, NY (US); Xiaopeng Li, Niskayuna, NY (US); Christopher James Kenny, Schoharie, NY (US); Gregory Edward Cooper, Greenfield Center, NY (US); Biao Fang, Clifton Park, NY (US); Pascal Meyer, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 16/951,011

(22) Filed: Nov. 18, 2020

(65) Prior Publication Data
US 2022/0154486 A1    May 19, 2022

(51) Int. Cl.
*B33Y 70/10*        (2020.01)
*B33Y 80/00*        (2015.01)
(Continued)

(52) U.S. Cl.
CPC ............ *E04H 12/341* (2013.01); *B33Y 70/10* (2020.01); *F03D 13/22* (2016.05); *B33Y 80/00* (2014.12)

(58) Field of Classification Search
CPC ....... E04H 12/341; B33Y 70/10; B33Y 80/00; F03D 13/22
See application file for complete search history.

(56) References Cited

U.S. PATENT DOCUMENTS

| 3,516,129 A | 6/1970 | Yoder |
| 7,452,196 B2 | 11/2008 | Khoshnevis |
(Continued)

FOREIGN PATENT DOCUMENTS

| CN | 202023701 U | 11/2011 |
| CN | 104328845 B | 3/2017 |
(Continued)

OTHER PUBLICATIONS

Extended European Search Report for EP application No. 21206750.8, dated May 6, 2022.
(Continued)

*Primary Examiner* — Rick K Chang
(74) *Attorney, Agent, or Firm* — Dority & Manning, P.A.

(57) ABSTRACT

A method of manufacturing a tower structure includes providing an additive printing device having at least one printer head atop a support surface. The method also includes positioning a pre-fabricated component adjacent to the support surface. The pre-fabricated component is constructed of a composite material reinforced with a plurality of reinforcement members. Further, portions of the plurality of reinforcement members protrude from the composite material. Moreover, the method includes printing and depositing, via the at least one printer head, a cementitious material onto the support surface to build up the tower structure layer by layer around the pre-fabricated component. Thus, the portions of the plurality of reinforcement members that protrude from the composite material reinforce the cementitious material around the pre-fabricated component.

17 Claims, 11 Drawing Sheets

(51) Int. Cl.
  *E04H 12/34* (2006.01)
  *F03D 13/20* (2016.01)

(56) References Cited

U.S. PATENT DOCUMENTS

| | | | |
|---|---|---|---|
| 8,359,798 | B2 | 1/2013 | Armbrecht et al. |
| 8,778,479 | B2 | 7/2014 | Bech |
| 9,331,534 | B2 | 5/2016 | Yost |
| 10,260,480 | B2 | 4/2019 | Beramendi Ortega et al. |
| 10,513,833 | B2 | 12/2019 | Phuly |
| 10,543,617 | B2 * | 1/2020 | Grivetti .................. E04B 1/35 |
| 2007/0181767 | A1 | 8/2007 | Wobben |
| 2012/0159785 | A1 | 6/2012 | Pyles et al. |
| 2015/0300036 | A1 | 10/2015 | Khoshnevis |
| 2017/0016244 | A1 | 1/2017 | Keller et al. |
| 2017/0305034 | A1 | 10/2017 | Grivetti et al. |
| 2018/0171575 | A1 | 6/2018 | Prusty et al. |
| 2019/0226174 | A1 | 7/2019 | Schuldt et al. |

FOREIGN PATENT DOCUMENTS

| | | |
|---|---|---|
| CN | 104453014 B | 4/2017 |
| EP | 2064393 B1 | 7/2012 |
| EP | 1711328 B1 | 3/2013 |
| FR | 3073170 A1 | 5/2019 |
| GB | 2525400 A | 10/2015 |
| KR | 102075170 B1 | 2/2020 |
| WO | WO2016/055222 A1 | 4/2016 |
| WO | WO2017/092766 A1 | 6/2017 |
| WO | WO 2020/068122 A1 | 4/2020 |

OTHER PUBLICATIONS

APIS COR, Laying Down Framework and Walls, Apr. 6, 2016. (WEBLINK ONLY) https://www.youtube.com/watch?v=ViqzfPW6TFo.

Bos et al., Experimental Exploration of Metal Cable as Reinforcement in 3D Printed Concrete, MDPI, Journals, Materials, vol. 10, Issue 11, 2017, 1314, 22 Pages. https://doi.org/10.3390/ma10111314.

Cowan, The World's First Family to Live in a 3D-Printed Home, BBC News, Jul. 5, 2018, 12 Pgs. Retrieved on Sep. 1, 2020 from: https://www.bbc.com/news/technology-44709534.

FHWA, Chapter 8—Rebar Cages, Drilled Shafts: Construction Procedures by FHWA, PileBuck, Jun. 29, 2016, 11 Pages. http://www.pilebuck.com/drilled-shafts-construction-procedures-fhwa/chapter-8-rebar-cages/.

Gosselin et al., Large-Scale 3D-Printing of Ultra-high Performance Concrete—A New Processing Route for Architects and Builders, ScienceDirect, Materials & Design, vol. 100, No. 15, Jun. 15, 2016, pp. 102-109.

Irving, 3D Printed Reinforced Concrete Bridge Opens in the Netherlands, New Atlas, Architecture, Oct. 17, 2017, 8 Pages. https://newatlas.com/3d-printed-concrete-bridge/51796/.

Marijnissen et al, 3D Concrete Printing in Architecture: A research on the potential benefits of 3D Concrete Printing in Architecture, Material Studies—Methodologies, vol. 2—eCAADe 35, pp. 299-308. http://papers.cumincad.org/data/works/att/ecaade2017_087.pdf.

Mechtcherne et al., 3D-Printed Steel Reinforcement for Digital Concrete Construction—Manufacture, Mechanical Properties and Bond Behaviour, ScienceDirect, Construction and Building Materials, vol. 179, No. 10, Aug. 10, 2018, pp. 125-137. (ABSTRACT ONLY) https://doi.org/10.1016/j.conbuildmat.2018.05.202.

Molitch-Hou, 400-Square-Meter Villa 3D Printed Onsite in Just 45 Days, Engineering.com, 3D Printing, Jun. 2016. (WEBLINK ONLY) https://www.engineering.com/3DPrinting/3DPrintingArticles/ArticleID/12415/400-Square-Meter-Villa-3D-Printed-Onsite-in-Just-45-Days.

Zareiyan et al., Effects of Interlocking on Interlayer Adhesion and Strength of Structures in 3D Printing of Concrete, ScienceDirect, Automation in Construction, vol. 83, Nov. 2017, pp. 212-221. https://www.researchgate.net/publication/319162312_Effects_of_interlocking_on_interlayer_adhesion_and_strength_of_structures_in_3D_printing_of_concrete.

* cited by examiner

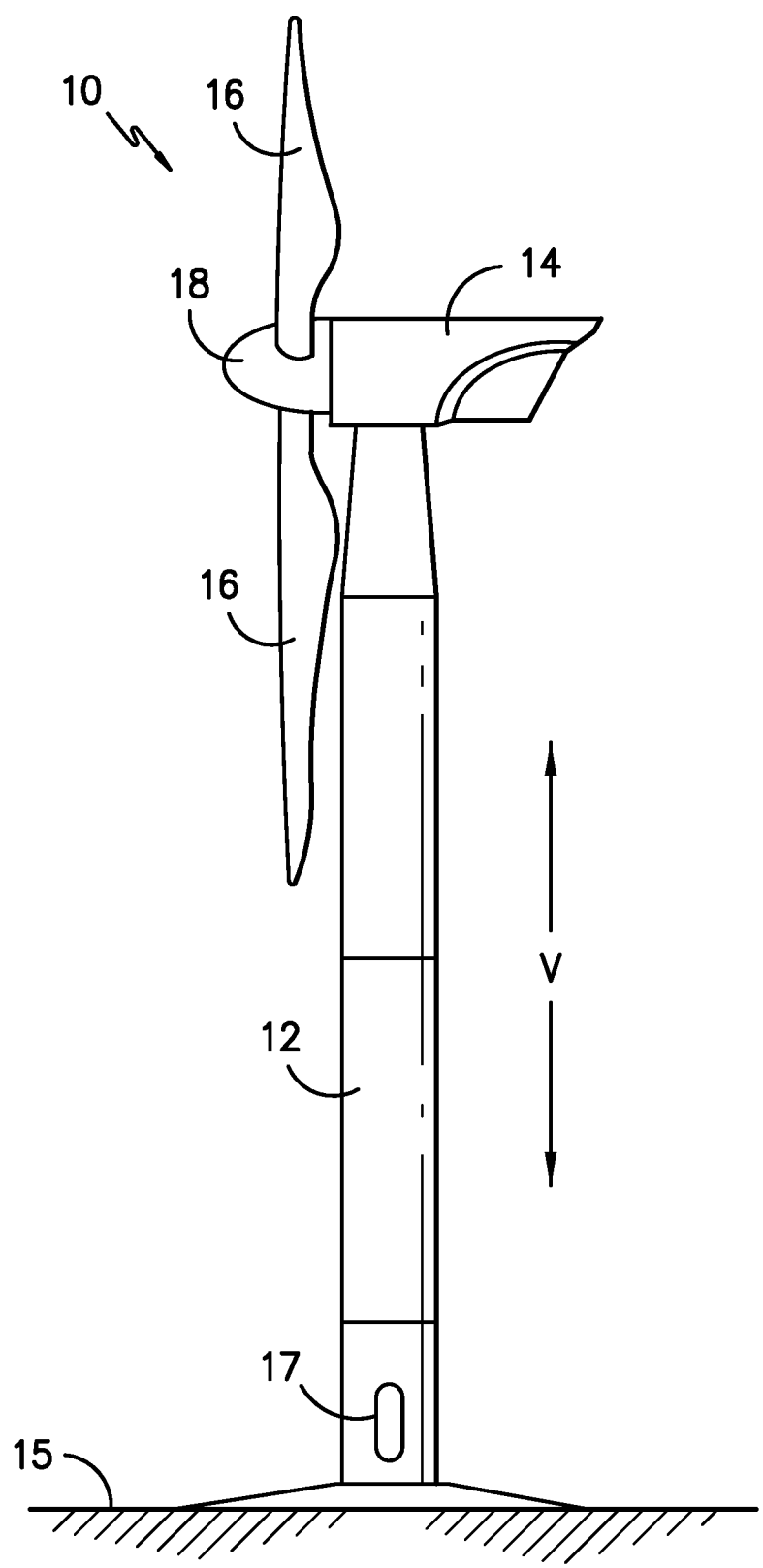
FIG. -1-

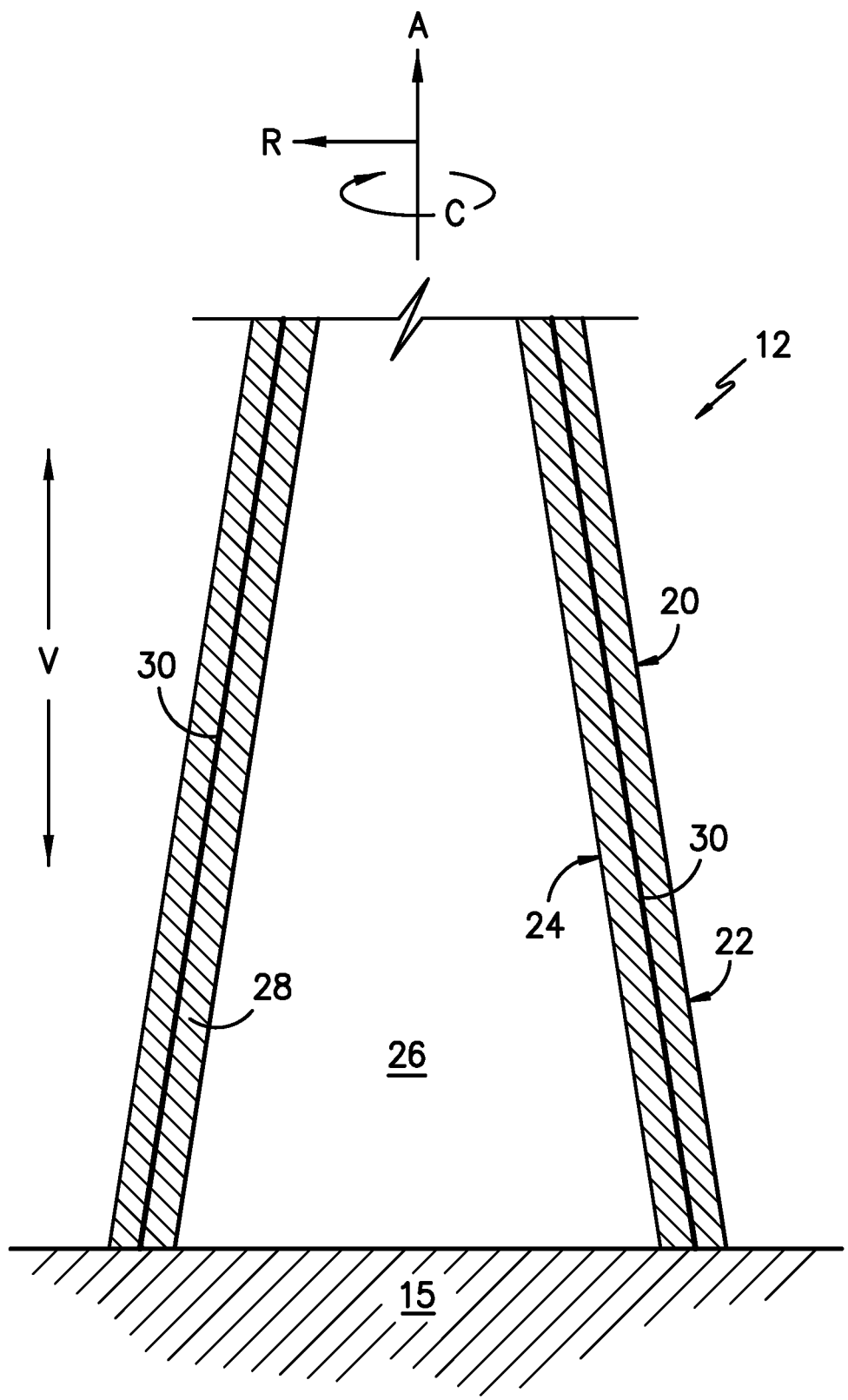
FIG. -2-

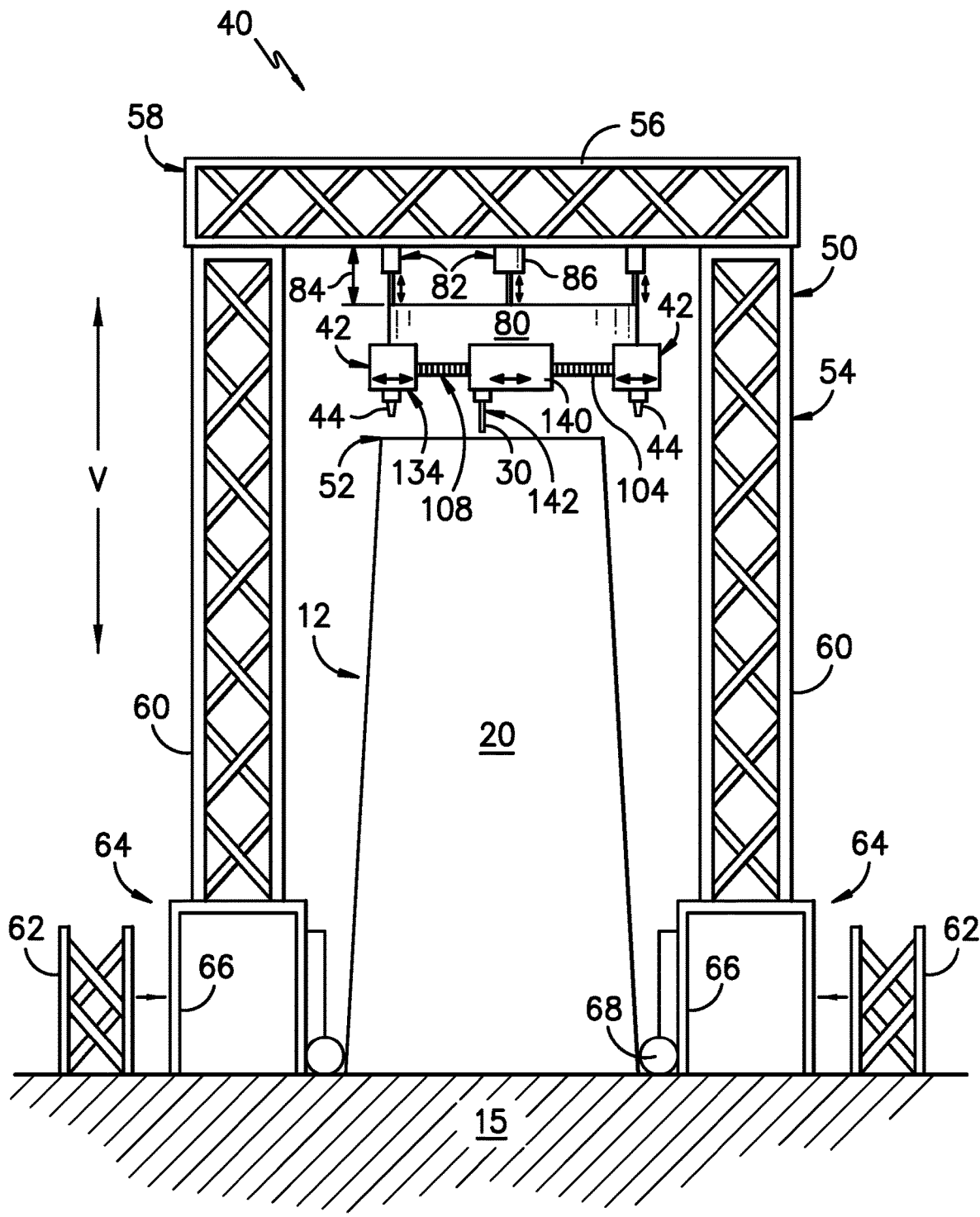
FIG. -3-

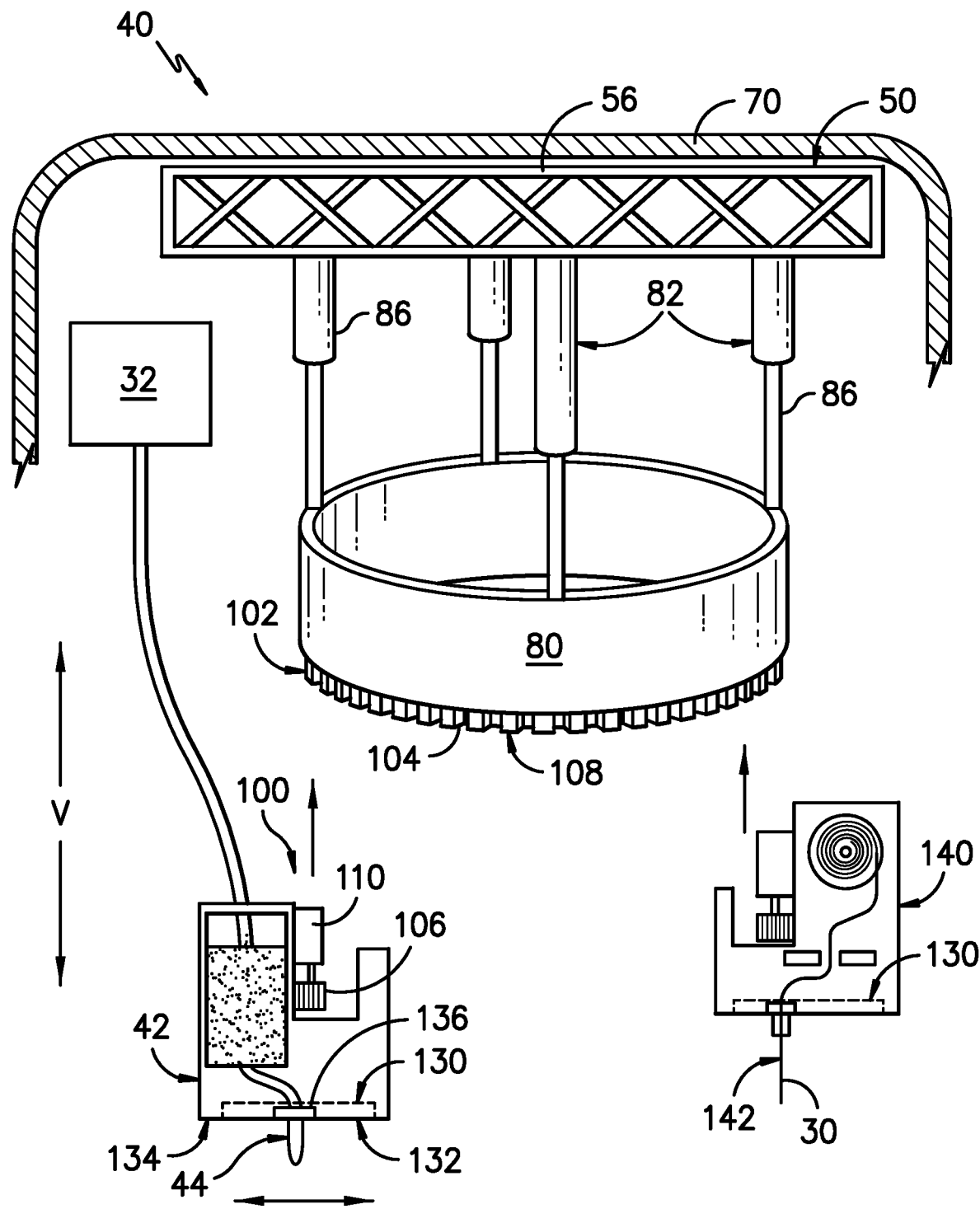
FIG. -4-

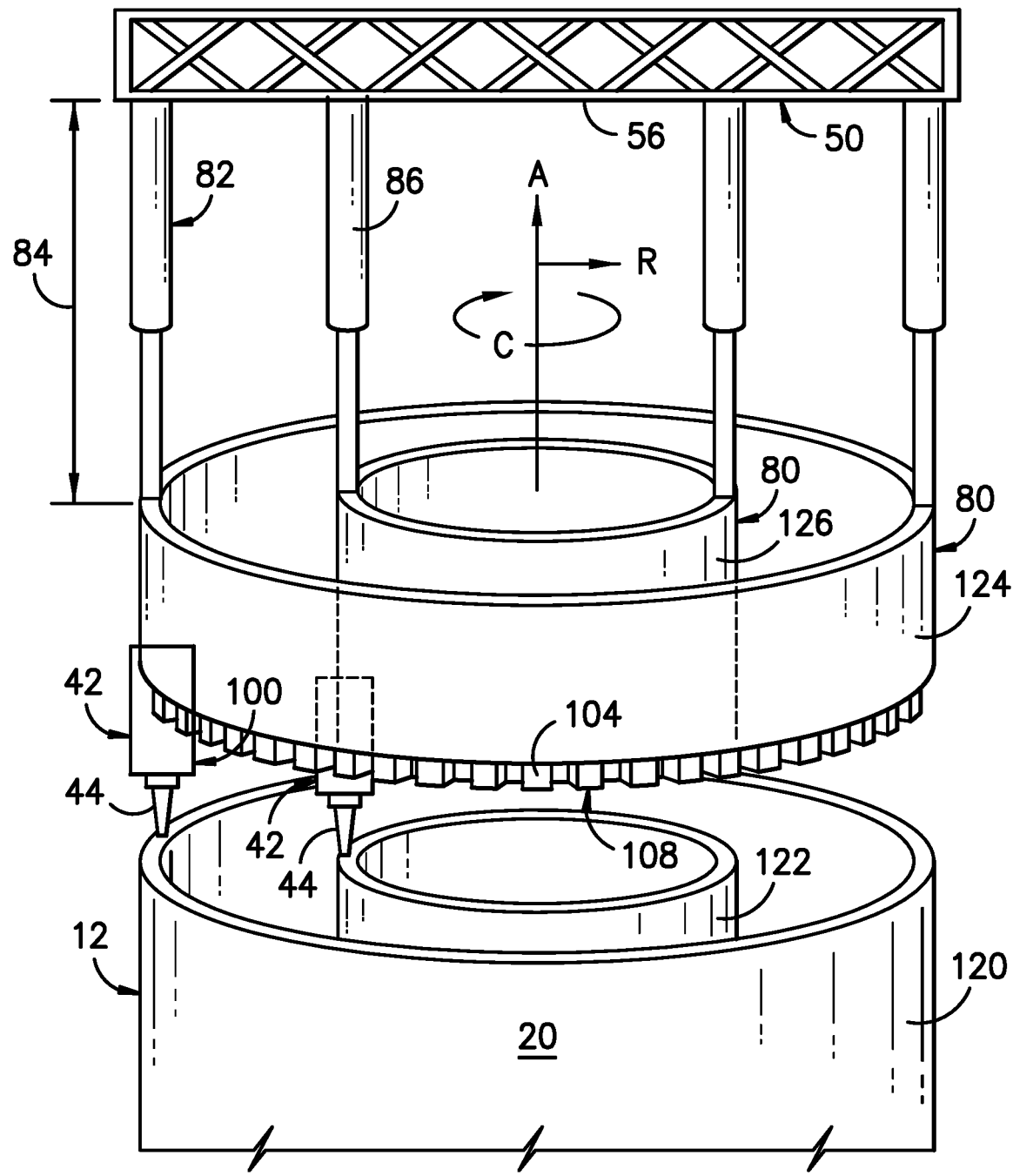
FIG. -5-

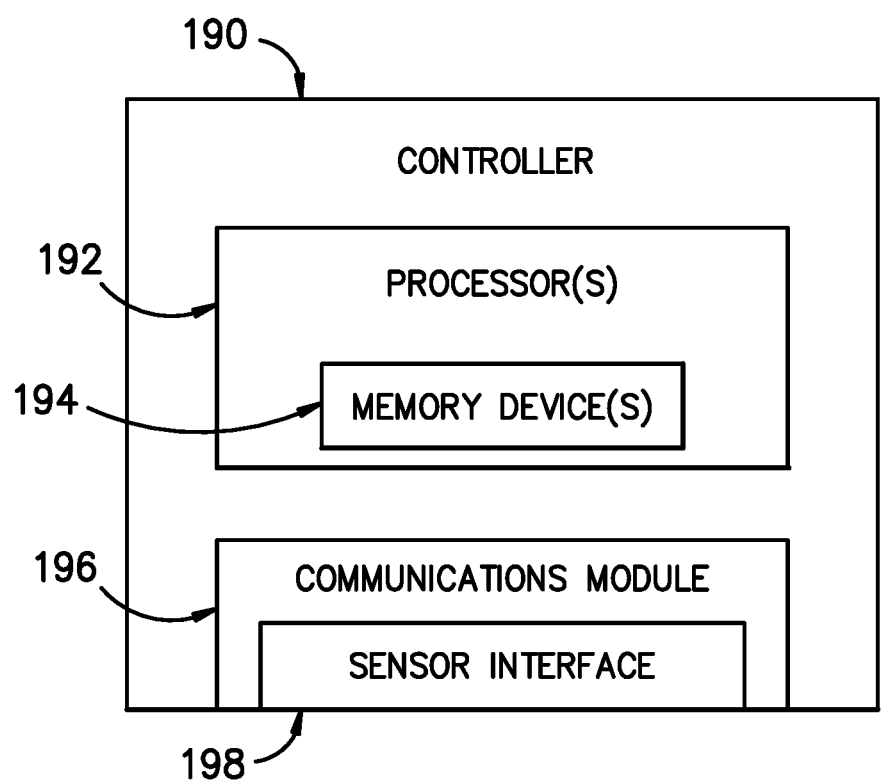
FIG. -6-

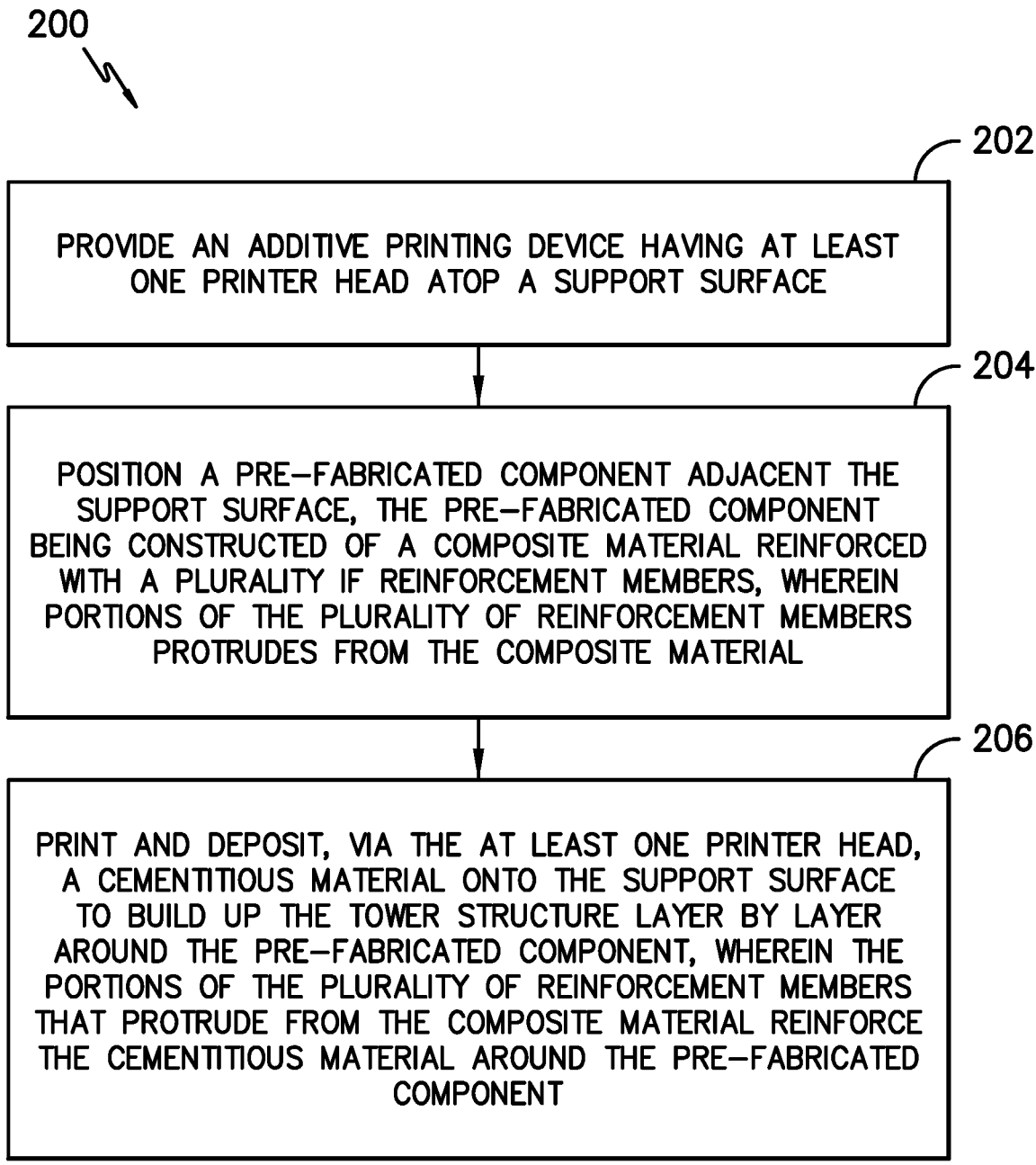
FIG. -7-

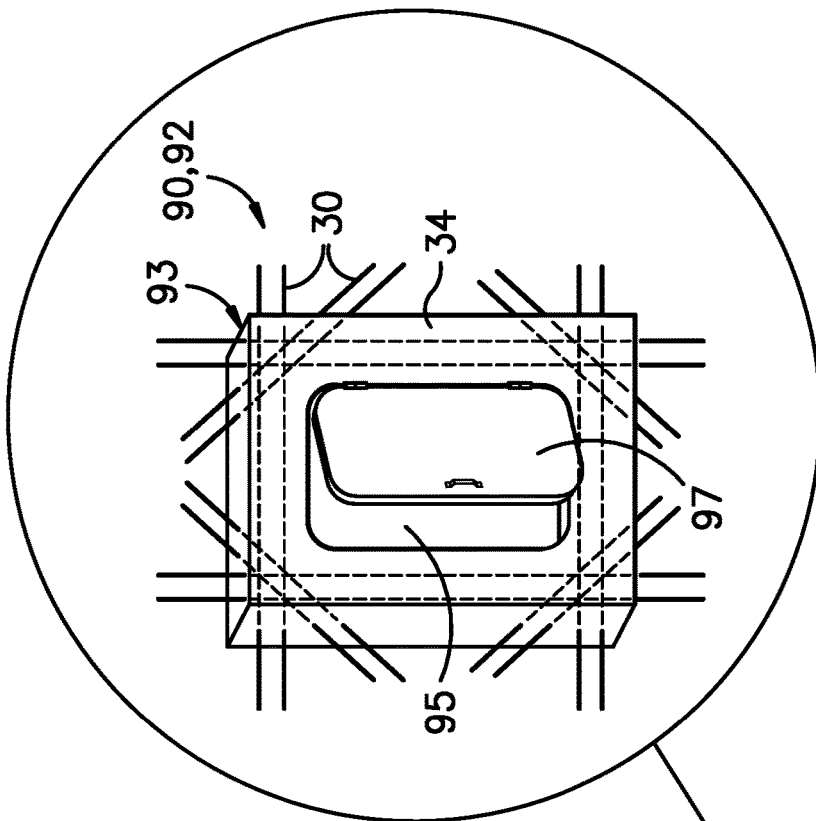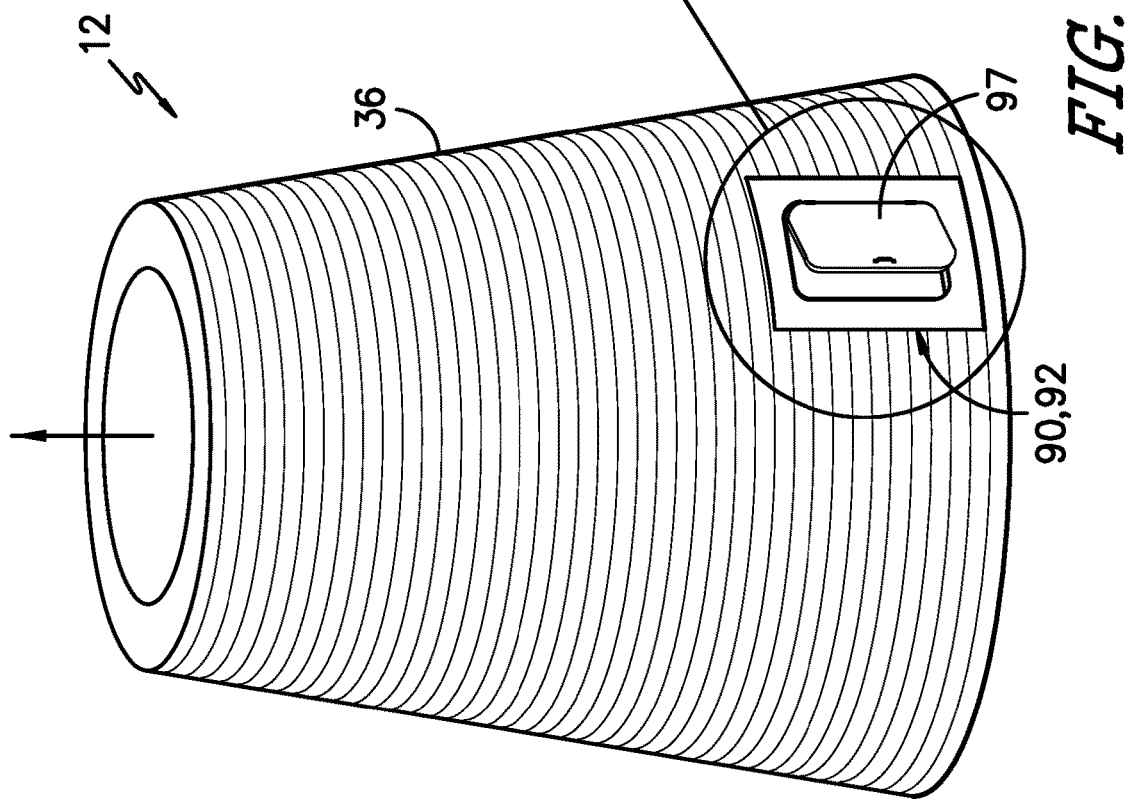
FIG. -8-

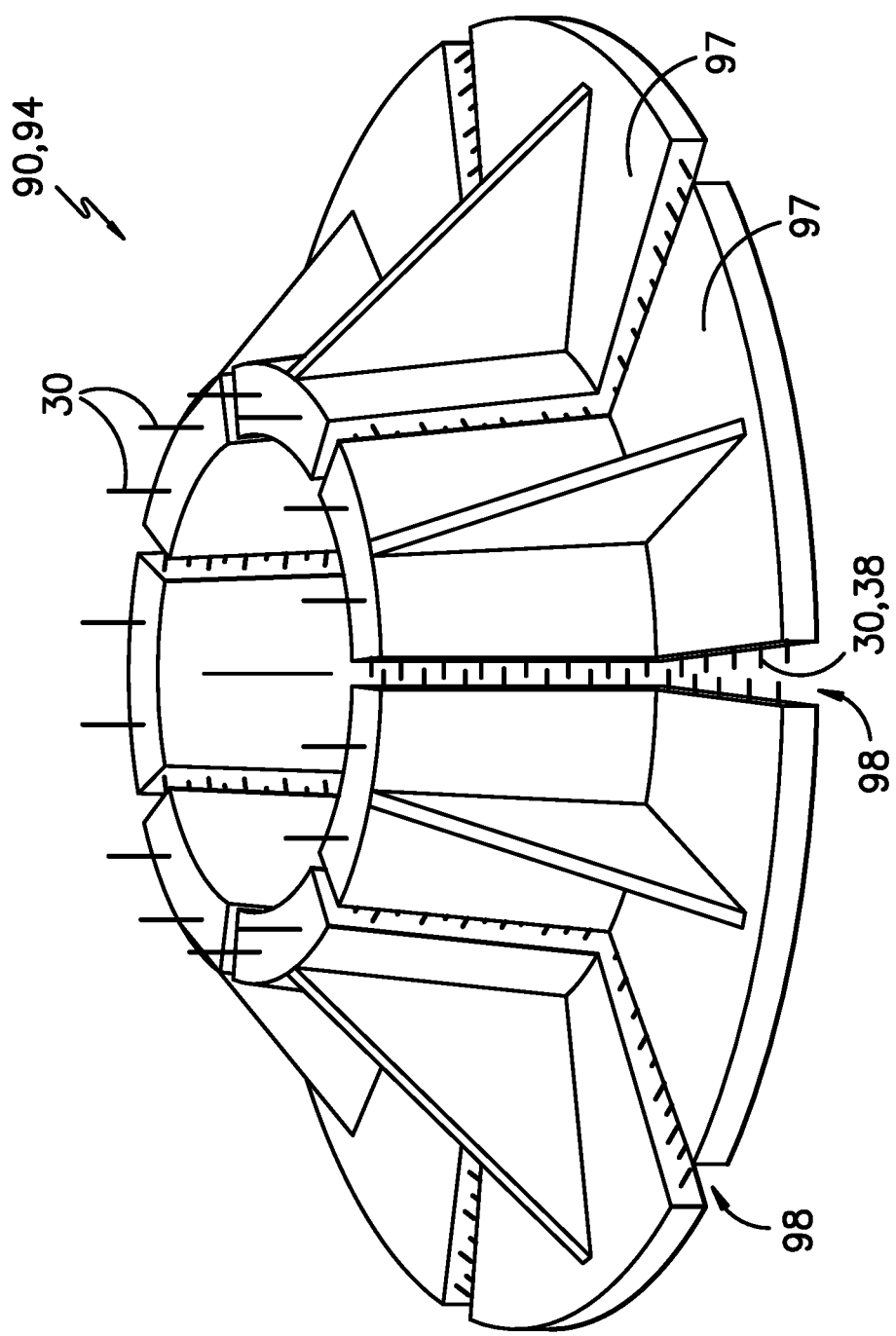
FIG. -9-

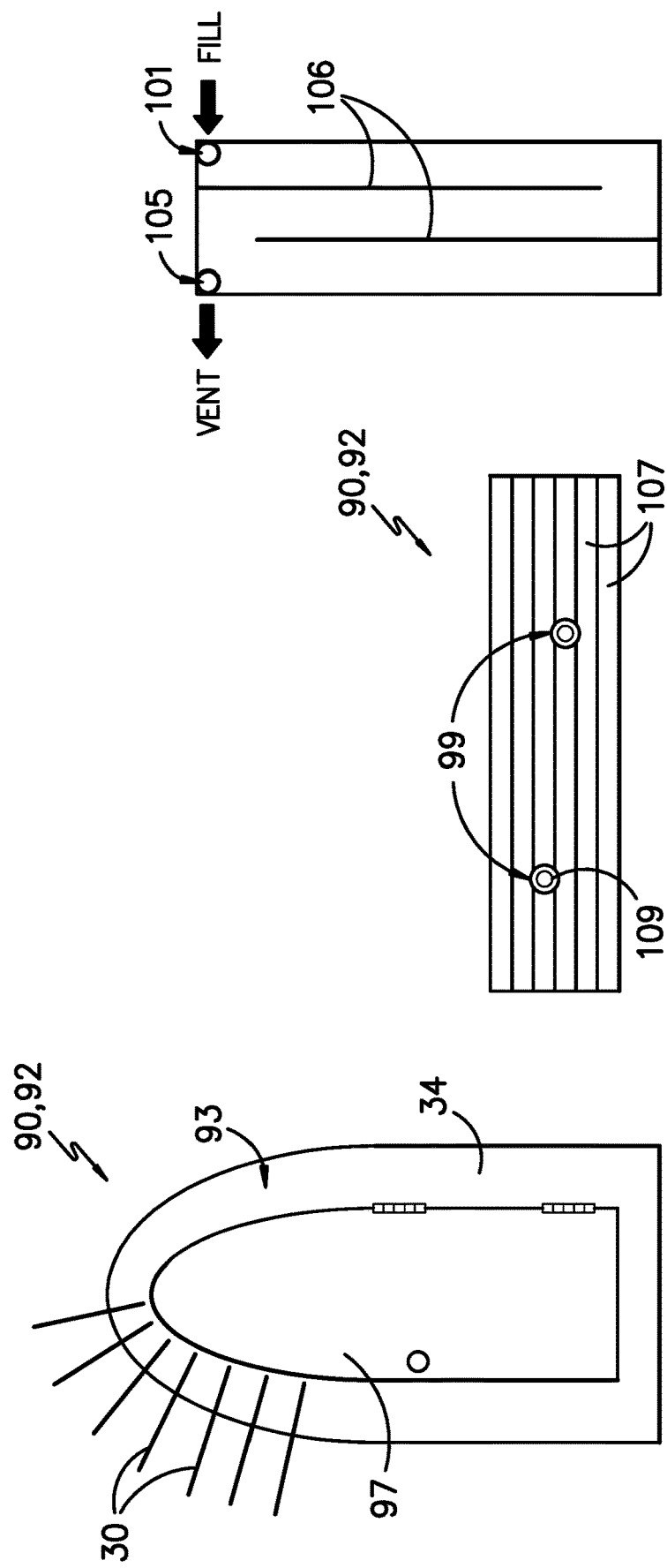

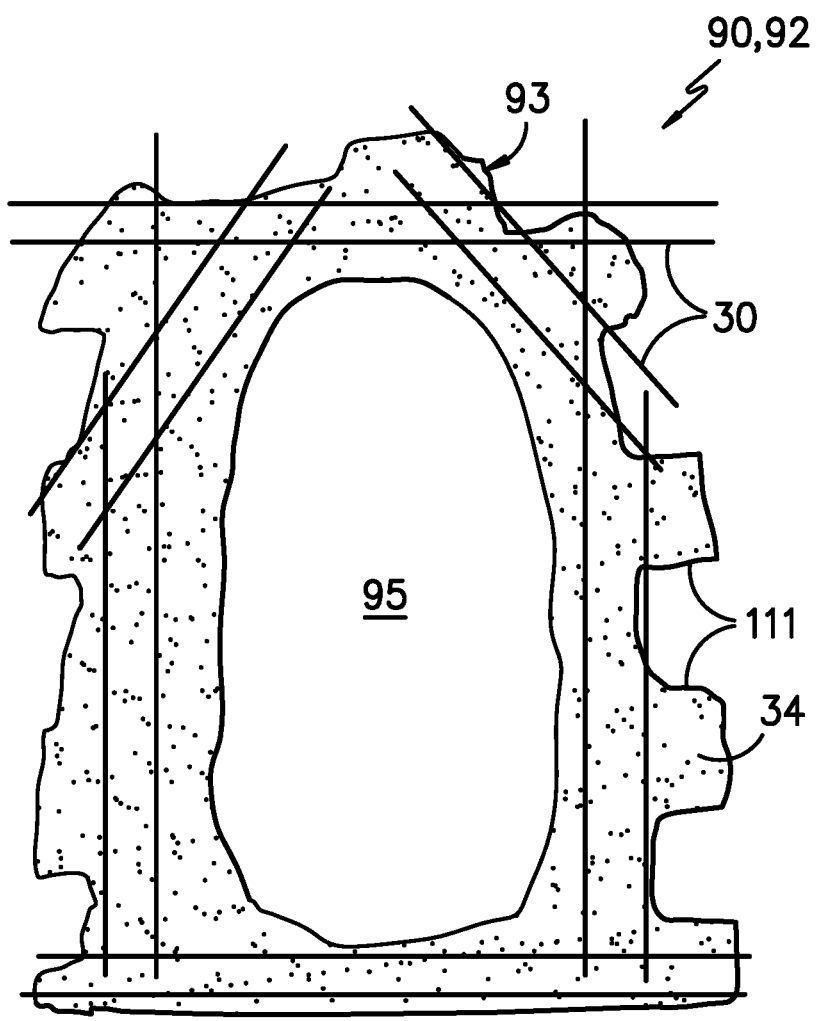
FIG. -13-
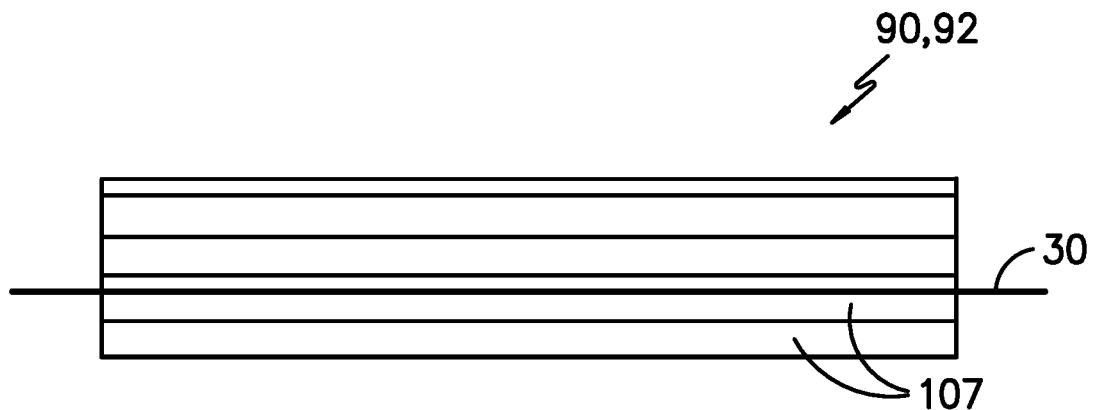
FIG. -14-

PRE-FABRICATED COMPONENT FOR AN ADDITIVELY MANUFACTURED WIND TURBINE TOWER STRUCTURE

FIELD

The present disclosure relates in general to wind turbine tower structures, and more particularly to a pre-fabricated component, such as a pre-fabricated door assembly or a pre-fabricated foundation assembly, that can be easily incorporated into an additively manufactured wind turbine tower structure.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower is generally constructed of steel tubes, pre-fabricated concrete sections, or combinations thereof. Further, the tubes and/or concrete sections are typically formed off-site, shipped on-site, and then arranged together to erect the tower. For example, one manufacturing method included forming pre-cast concrete rings, shipping the rings to the site, arranging the rings atop one another, and then securing the rings together. As wind turbines continue to grow in size, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting and/or welding. Such methods, however, require extensive labor and can be time-consuming.

In view of the foregoing, the art is continually seeking improved methods for manufacturing wind turbine towers. For example, more recently, progress has been made in the construction of wind turbine towers, at least in part, using additive printing techniques. Such methods allow for the tower structures to be erected on site and also allow the structures to be built to taller heights. During construction of existing towers, it may be often desirable to include a pre-fabricated component, such as a pre-fabricated door or a section of a foundation, in the structure. However, additional reinforcement must also be included around such components as the tower is being built. In addition, reinforcement replacement can be difficult to automate since the reinforcements (e.g. rebar) must be placed in various orientations around the pre-fabricated component.

Accordingly, the present disclosure is directed to a pre-fabricated component for use in an additively manufactured wind turbine tower structure that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method of manufacturing a tower structure. The method includes providing an additive printing device having at least one printer head atop a support surface. The method also includes positioning a pre-fabricated component adjacent to the support surface (e.g. such as within or on top of the support surface). The pre-fabricated component may be constructed of a composite material reinforced with a plurality of reinforcement members. Further, portions of the plurality of reinforcement members protrude from the composite material. Moreover, the method includes printing and depositing, via the at least one printer head, a cementitious material onto the support surface to build up the tower structure layer by layer around the pre-fabricated component. Thus, the portions of the plurality of reinforcement members that protrude from the composite material reinforce the cementitious material around the pre-fabricated component.

In an embodiment, providing the additive printing device having the at least one printer head atop a support surface of the tower structure may include positioning a vertical support structure above the support surface of the tower structure, suspending a support member from the vertical support structure, and movably coupling the at least one printer head to the support member.

In another embodiment, the pre-fabricated component may be, for example, a pre-fabricated door assembly or a pre-fabricated foundation assembly.

For example, in particular embodiments, the pre-fabricated door assembly includes a door frame defining an access opening and a door for moving between an open position that exposes the access opening and a closed position that covers the access opening. In such embodiments, the plurality of reinforcement members are arranged within the composite material around the access opening. More particularly, in certain embodiments, the plurality of reinforcement members are arranged within the composite material at a plurality of different angles with respect to the access opening.

In further embodiments, the pre-fabricated foundation assembly may include a plurality of foundation segments. Thus, in certain embodiments, the method may include arranging the plurality of foundation segments together to form a foundation of the tower structure. In such embodiments, a gap exists between each of the plurality of foundation segments with the portions of the plurality of reinforcement members protruding from the composite material within the gaps.

In additional embodiments, the method may include constructing the pre-fabricated component via pre-casting the composite material to form the pre-fabricated component off site.

In another embodiment, the method may include constructing the pre-fabricated component via casting the composite material to form the pre-fabricated component on site prior to positioning the pre-fabricated component adjacent to the support surface of the tower structure.

In further embodiments, the method may include constructing the pre-fabricated component by printing and depositing the composite material via the at least one printer head to form the pre-fabricated component prior to positioning the pre-fabricated component adjacent to the support surface of the tower structure.

As an example, in an embodiment, the method may include vertically printing and depositing the composite material via the printer head(s) to form the pre-fabricated component. In such embodiments, vertically printing and depositing the composite material via the at least one printer head to form the pre-fabricated component on site may include vertically printing and depositing the composite material via the at least one printer head to form the pre-fabricated component with a plurality of holes formed therein and placing at least one of the plurality of reinforcement members within each of the plurality of holes to reinforce the pre-fabricated component.

In still further embodiments, the method may include vertically printing and depositing the composite material via the printer head(s) to form the pre-fabricated component off site and placing at least one of the plurality of reinforcement members within each of the plurality of holes to reinforce the pre-fabricated component onsite.

In particular embodiments, the method may further include placing a grommet in each of the plurality of holes prior to placing at least one of the plurality of reinforcement members within each of the plurality of holes.

In yet another embodiment, the method may include horizontally printing and depositing the composite material via the printer head(s) to form the pre-fabricated component. In such embodiments, the method may include placing at least one of the plurality of reinforcement members between layers of the pre-fabricated component as the pre-fabricated component is being horizontally printed and deposited.

In further embodiments, the composite material and the cementitious material may be the same or may be different. In one embodiment, the composite material may be a polymer, concrete, pitch resin, asphalt, clay, cement, mortar, a cementitious composition, and the like. Furthermore, the cementitious material may include concrete, pitch resin, asphalt, clay, cement, mortar, a cementitious composition, and the like.

In several embodiments, the tower structure described herein is part of a wind turbine.

In another aspect, the present disclosure is directed to a method of manufacturing a tower structure. The method includes printing and depositing, via at least one printer head, a composite material to build up a pre-fabricated component layer by layer. The method also includes reinforcing the cementitious material with a plurality of reinforcement members such that portions of the plurality of reinforcement members protrude from the composite material. Further, the method includes incorporating the pre-fabricated component into a cementitious material to form the tower structure, wherein the portions of the plurality of reinforcement members that protrude from the composite material reinforce the cementitious material around the pre-fabricated component.

For example, in an embodiment, incorporating the pre-fabricated component into the cementitious material to form the tower structure may include positioning the pre-fabricated component atop a support surface and printing and depositing, via the at least one printer head, the cementitious material onto the support surface to build up the tower structure layer by layer around the pre-fabricated component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a cross-sectional view of one embodiment of a tower structure of a wind turbine according to the present disclosure;

FIG. 3 illustrates a schematic view of an additive printing device that may be used to print the exemplary tower structure of FIG. 2 according to the present disclosure;

FIG. 4 illustrates a close-up view of certain components of the exemplary additive printing device of FIG. 3 according to the present disclosure;

FIG. 5 illustrates another close-up view of certain components of an exemplary additive printing device according to the present disclosure;

FIG. 6 illustrates a block diagram of one embodiment of a controller of an additive printing device according to the present disclosure;

FIG. 7 illustrates a flow diagram of one embodiment of a method for manufacturing a tower structure, e.g. of a wind turbine, according to the present disclosure;

FIG. 8 illustrates a perspective view of one embodiment of a tower structure having a pre-fabricated door assembly integrated therewith and formed using methods according to the present disclosure;

FIG. 9 illustrates a perspective view of one embodiment of a pre-fabricated foundation assembly according to the present disclosure;

FIG. 10 illustrates a front view of one embodiment of a pre-fabricated door assembly according to the present disclosure formed via vertical printing;

FIG. 11 illustrates a partial, side view of the pre-fabricated door assembly of FIG. 10;

FIG. 12 illustrates a partial, front view of one embodiment of a flow path for cementitious material for forming the pre-fabricated door assembly of FIG. 10;

FIG. 13 illustrates a front view of one embodiment of a pre-fabricated door assembly according to the present disclosure formed via horizontal printing; and FIG. 14 illustrates a side view of the pre-fabricated door assembly of FIG. 13 formed via horizontal printing.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an additive printing device and methods for manufacturing wind turbine towers using automated deposition of cementitious materials via technologies such as additive manufacturing, 3-D Printing, spray deposition, extrusion additive manufacturing, concrete printing, automated fiber deposition, as well as other techniques that utilize computer numerical control and multiple degrees of freedom to deposit material. More specifically, methods of the present disclosure include using an automated additive printing device to print a tower structure while also incorporating a pre-fabricated component therein. For example, in an embodiment, the pre-fabricated component may include a pre-fabricated door assembly or a pre-fabricated foundation assembly. Further, the pre-fabricated component is constructed of a composite material reinforced with a plurality of reinforcement members, with portions of the reinforcement members protruding from the composite material. In particular, the reinforcement members around the pre-fabricated component is purposely left extending beyond the component and into the surrounding printed or print-poured section of the overall tower structure. Accordingly, the additive printing device prints additional cementitious material to build up the tower structure layer by layer around the pre-fabricated component such that the portions of the reinforcement members protruding from the composite material reinforce the cementitious material around the pre-fabricated component.

Thus, the methods described herein provide many advantages not present in the prior art. For example, the pre-fabricated component includes the necessary reinforcement to strengthen the overall tower structure in the region of the component, thereby simplifying the process of reinforcement placement (which is relatively complex around the pre-fabricated component, as compared to the general tower structure). Moreover, the present disclosure may permit on-site printing of tower structures having any desirable size (e.g., greater than four meters in diameter), thereby enabling the construction of larger tower structures and wind turbines. These tall structures may be formed without requiring a tall crane or otherwise being limited by manufacturing or logistics constraints common to prior manufacturing methods. The methods also increase design flexibility, eliminate overall size restrictions, and permit the formation of tower structures having any desirable profile and cross sectional shape. The additive printing device may also utilize any suitable number of printer heads to decrease manufacturing time. Other features and advantages will be apparent to those skilled in the art.

Referring now to the drawings, FIG. 1 illustrates a perspective view of one embodiment of a wind turbine 10 according to the present disclosure. As shown, the wind turbine 10 includes a tower 12 extending from a foundation 15 or support surface with a nacelle 14 mounted atop the tower 12. A plurality of rotor blades 16 are mounted to a rotor hub 18, which is in turn connected to a main flange that turns a main rotor shaft. The wind turbine power generation and control components (not shown) are typically housed within the nacelle 14. Moreover, as shown, the tower 12 may also include a door 17.

The view of FIG. 1 is provided for illustrative purposes only to place the present invention in an exemplary field of use. It should be appreciated that the invention is not limited to any particular type of wind turbine configuration. In addition, the present invention is not limited to use with wind turbine towers, but may be utilized in any application having concrete constructions and/or tall tower structures in addition to wind towers, including for example homes, bridges, tall towers, and other aspects of the concrete industry. Further, the methods described herein may also apply to manufacturing any similar structure that benefits from the advantages described herein.

Referring now to FIG. 2, the tower structure 12 of the wind turbine 10 of FIG. 1 is described in more detail according to an exemplary embodiment of the present disclosure. Specifically, FIG. 2 illustrates a partial, cross-sectional view of one embodiment of the tower structure 12 of the wind turbine 10 according to the present disclosure. As shown, the tower structure 12 defines a generally circumferential tower wall 20 having an outer surface 22 and an inner surface 24. Further, as shown, the circumferential tower wall 20 generally defines a hollow interior 26 that is commonly used to house various turbine components (e.g. a power converter, transformer, etc.). In addition, as will be described in more detail below, the tower structure 12 is formed using additive manufacturing.

Moreover, as shown, the tower structure 12 is formed of one or more cementitious materials 28 that is reinforced with one or more reinforcement members 30 (FIG. 2), such as elongated cables or wires, helical cables or wires, reinforcing bars (also referred to as rebar), mesh reinforcing fibers (metallic or polymeric), reinforcing metallic rings (circular, oval, spiral and others as may be relevant), and/or couplings. According to exemplary embodiments, the cementitious material 28 may be provided through any suitable supply system 32 (see, e.g., FIG. 4). Further, as shown, the reinforcement members 30 may be embedded in the cementitious material 28 during the printing process, as described in more detail below. As used herein, the cementitious materials 28 may include any suitable workable paste that is configured to bind together after curing to form a structure. Suitable cementitious materials include, for example, concrete, pitch resin, asphalt, clay, cement, mortar, cementitious compositions, or similar materials or compositions.

According to exemplary embodiments of the present disclosure, an adhesive material (not shown) may also be provided between one or more of the cementitious materials 28 and the foundation 15, the cementitious material 28 and reinforcement members 30, or multiple layers of the cementitious material 28 and reinforcement members 30. Thus, the adhesive material may further supplement interlayer bonding between materials.

The adhesive material described herein may include, for example, cementitious material such as mortar, polymeric materials, and/or admixtures of cementitious material and polymeric material. Adhesive formulations that include cementitious material are referred to herein as "cementitious mortar." Cementitious mortar may include any cementitious material, which may be combined with fine aggregate. Cementitious mortar made using Portland cement and fine aggregate is sometimes referred to as "Portland cement mortar," or "OPC." Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Exemplary polymeric materials that may be utilized in an adhesive formulation include may include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of exemplary polymeric materials are described in ASTM C1059/C1059M-13, Standard Specification for Latex Agents for Bonding Fresh To Hardened Concrete.

Referring now generally to FIGS. 3 through 5, an additive printing device 40 is described according to an exemplary embodiment of the present disclosure. Notably, all or part of tower structure 12 may be printed, layer-by-layer, using the additive printing device 40, which may use any suitable mechanisms for depositing layers of additive material, such as concrete, to form tower structure 12. Thus, aspects of the present disclosure are directed to methods for manufacturing wind turbine towers via additive manufacturing. Additive manufacturing, as used herein, is generally understood to encompass processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers, but are also capable of printing curved and/or irregular shapes.

It should be further understood that the additive printing device 40 described herein generally refers to any suitable additive printing device having one or more nozzles for depositing material (such as the cementitious material 28) onto a surface that is automatically controlled by a controller to form an object programmed within the computer (such as a CAD file). More specifically, as shown in FIG. 3 and described below, the additive printing device 40 includes one or more printer heads 42 having any suitable number of nozzles 44 and being independently movable to simultaneously print layers of the tower structure 12.

Referring still to FIGS. 3 through 5, the additive printing device 40 is described in more detail according to exemplary embodiments of the present disclosure. As illustrated, the additive printing device 40 may include a vertical support structure 50 which is generally configured for suspending one or more of the printer heads 42 above tower structure 12 during the printing process. In this regard, the vertical support structure 50 may extend from the ground or from foundation 15 upwards substantially along a vertical direction V to a position at least partially above a top 52 of the tower structure 12 (e.g., and also above foundation 15 before the first layer is printed).

As illustrated, the vertical support structure 50 may include a plurality of support towers 54 and one or more gantry beams 56 that extend between at least two of the support towers 54. Although two support towers 54 and a single gantry beam 56 are illustrated in the FIGS. 3 through 5, it should be appreciated that any suitable number and position of support towers 54 may be used according to alternative embodiments. In addition, the support towers 54 and the gantry beams 56 are illustrated as being truss-like structures (e.g. similar to a tower crane), but could be formed in any other suitable manner or have any other configuration according to alternative embodiments.

In addition, although the vertical support structure 50 is illustrated as being positioned on the outside of the tower structure 12, it should be appreciated that according to alternative embodiments, the vertical support structure 50 may be positioned inside the tower structure 12. According to still other embodiments, the vertical support structure 50 may include the support towers 54 positioned both inside and outside of the tower structure 12. In addition, the additive printing device 40 may be suspended from the vertical support structure 50 using any other suitable system or mechanism.

Notably, during the additive printing process, the top 52 of tower structure 12 is built layer-by-layer, rising along the vertical direction V. Therefore, the vertical support structure 50 may be an expandable support structure which may be raised along with the height of tower structure 12. In this regard, the vertical support structure 50 may be formed from a plurality of stacked segments 60 which are positioned adjacent each other along the vertical direction V and joined to form the rigid vertical support structure 50. Thus, when the tower structure 12 approaches the top 58 of the vertical support structure 50, additional segments 62 may be added to stacked segments 60 to raise the overall height of vertical support structure 50.

Referring specifically to FIG. 3, additional segments 62 may be combined with stacked segments 60 to raise the vertical support structure 50 using a jacking system 64. In general, as shown, the jacking system 64 may be positioned proximate foundation 15 and is configured for raising the vertical support structure 50 (e.g. including the stacked segments 60 and the gantry beams 56) and inserting additional segments 62. Specifically, a separate jacking system 64 may be positioned at a bottom of each support tower 54.

According to an exemplary embodiment, the jacking system 64 may include a jacking frame 66 and a jacking mechanism 68 which are positioned at the bottom of stacked segments 60. The jacking mechanism 68 described herein may generally be any suitable hydraulically, pneumatically, or mechanically actuated system for raising the vertical support structure 50. Accordingly, when additional segments 62 need to be added, a dedicated jacking mechanism 68 simultaneously raises each of the support towers 54 such that additional segments 62 may be inserted. Specifically, the jacking frame 66 may support the weight of the vertical support structure 50 as additional segments 62 are positioned below the lowermost stacked segments 60. Additional segments 62 are joined to stacked segments 60 using any suitable mechanical fasteners, welding, etc. This process may be repeated as needed to raise the total height of the vertical support structure 50.

In certain situations, it may be desirable to protect the tower structure 12 and components of the additive printing device 40 from the external environment in which they are being used. In such embodiments, the tower cover 70 may generally be any suitable material positioned around the vertical support structure 70. For example, the tower cover 70 may be a fabric-like material draped over or attached to the vertical support structure 50 (e.g., over the support towers 54 and/or the gantry beams 56).

As mentioned briefly above, the vertical support structure 50 is generally configured for supporting one or more of the printer heads 42 and or other modules which facilitate the formation of the tower structure 12. Referring specifically to FIGS. 3 through 5, the additive printing device 40 may further include one or more support members, such as support rings 80, that are suspended from the vertical support structure 50, or more specifically from gantry beams 56, above the tower structure 12. For example, as illustrated, the support ring 80 is mounted to the gantry beam 56 using a vertical positioning mechanism 82. In general, the vertical positioning mechanism 82 is configured for adjusting a height or vertical distance 84 measured between the gantry beam 56 and a top of support ring 80 along the vertical direction V. For example, the vertical positioning mechanism 82 may include one or more hydraulic actuators 86 extending between gantry beam 56 and support ring 80 for moving support ring 80 and printer heads 42 along the vertical direction V as tower structure 12 is built up layer-by-layer.

As illustrated, the hydraulic actuators 86 are configured for adjusting the vertical distance 84 to precisely position nozzles 44 of the printer heads 42 immediately above top 52 of the tower structure 12. In this manner, the additive printing process may be precisely controlled. However, it should be appreciated that according to alternative embodiments, the vertical motion of the printer heads 42 may be adjusted in any other suitable manner. For example, according to exemplary embodiments, the support ring 80 may be rigidly fixed to the gantry beam 56 while the support ring 80 and/or the printer heads 42 are used to facilitate vertical motion to precisely position nozzles 44. For example, the printer heads 42 may be slidably mounted to the support ring 80 using a vertical rail and positioning mechanism to adjust the vertical position relative to the support ring 80 and the tower structure 12.

According to the illustrated embodiment, the printer head(s) 42 is movably coupled to the support ring 80 such that the nozzles 44 may deposit cementitious material 28 around a perimeter of tower structure 12 while the support ring 80 remains rotationally fixed relative to gantry beam 56. In this regard, for example, a drive mechanism 100 may operably couple the printer head(s) 42 to the support ring 80 such that printer head(s) 42 may be configured for moving around a perimeter 102 of the support ring 80 (e.g., about a circumferential direction C) while selectively depositing the cementitious material 28. One exemplary drive mechanism 100 is described below and illustrated in the figures, but it should be appreciated that other drive mechanisms are contemplated and within the scope of the present disclosure.

As best shown in FIG. 4, for example, the drive mechanism 100 may include a ring gear 104 that is positioned on the support ring 80 and a drive gear 106 that is rotatably mounted to printer head 42. Specifically, as illustrated, the ring gear 104 is defined on a bottom 108 of the support ring 80. Thus, when printer head(s) 42 42 is mounted on the bottom 108 of support ring 80, drive gear 106 engages ring gear 104. The drive mechanism 100 may further include a drive motor 110 that is mechanically coupled to the drive gear 106 for selectively rotating the drive gear 106 to move printer head(s) 42 around a perimeter 102 of the support ring 80. In this manner, the support ring 80 may remain stationary while printer head(s) 42 moves around the support ring 80 while depositing the cementitious material 28 to form a cross-sectional layer of tower structure 12.

Although the drive mechanism 100 is illustrated herein as a rack and pinion geared arrangement using drive gear 106 and ring gear 104, it should be appreciated that any other suitable drive mechanism 100 may be used according to alternative embodiments. For example, the drive mechanism 100 may include a magnetic drive system, a belt drive system, a frictional roller drive system, or any other mechanical coupling between printer head(s) 42 and support ring 80 which permits and facilitates selective motion between the two.

In addition, in an embodiment, the support ring 80 may generally have a diameter that is substantially equivalent to a diameter of the tower structure 12. However, it may be desirable to print the tower structure 12 having a non-fixed diameter or a tapered profile. In addition, as illustrated for example in FIG. 5, the tower structure 12 may include an outer tower wall 120 spaced apart along a radial direction R from an inner tower wall 122. For example, the outer tower wall 120 may be printed to define a mold for receiving poured concrete, e.g., to decrease printing time and total construction time.

Thus, as shown, the additive printing device 40 may include a plurality of concentric support rings 80 and printer heads 42 for simultaneously printing each of the outer tower wall 120 and the inner tower wall 122. Specifically, as illustrated, an outer support ring 124 may be positioned above the outer tower wall 120 and have a substantially equivalent diameter to the outer tower wall 120. Similarly, the inner support ring 126 may be positioned above the inner tower wall 122 and have a substantially equivalent diameter to the inner tower wall 122. It should be appreciated that as used herein, terms of approximation, such as "approximately," "substantially," or "about," refer to being within a ten percent margin of error. According to this exemplary embodiment, each of outer support ring 124 and inner support ring 126 may include dedicated printer heads 42 and/or other modules for facilitating the printing process of outer tower wall 120 and inner tower wall 122, respectively.

Referring again to FIG. 4, the printer head(s) 42 may include mechanisms for adjusting the position of nozzles 44 on printer head(s) 42. For example, printer head(s) 42 may include a radial adjustment mechanism 130 that is configured for moving print nozzle 44 along the radial direction R. Specifically, according to the illustrated embodiment, radial adjustment mechanism 130 includes a slide rail 132 mounted to a bottom 134 of printer head 42. The slide rail 132 extends substantially along the radial direction and is configured for slidably receiving the nozzle 44.

The radial adjustment mechanism 130 may further include an actuating mechanism 136 that moves print nozzle 44 along the radial direction R within the slide rail 132. For example, the actuating mechanism 136 may include any suitable actuator or positioning mechanism for moving nozzle 44 within the slide rail 132. In this regard, for example, the actuating mechanism 136 may include one or more of a plurality of linear actuators, servomotors, track conveyor systems, rack and pinion mechanisms, ball screw linear slides, etc.

Referring still to FIGS. 3 and 4, the additive printing device 40 may include any other suitable number of subsystems or modules to facilitate and improved printing process or improved finishing of tower structure 12. For example, as best illustrated in FIG. 4, the additive printing device 40 may include a reinforcement module 140 which is movably coupled to the support ring 80 and is configured for embedding one or more support members 142 at least partially within tower structure 12. In this regard, for example, the reinforcement module 140 may be similar to the printer head(s) 42 in that engages the support ring 80 and may move around a perimeter 102 of the support ring 80 while depositing the support members 142.

For example, according to the exemplary embodiments, the support members 142 may be reinforcement bars (i.e., rebar), tensioning cables, or any other suitable structural support members, as explained briefly below. For example, as shown in FIG. 2, the reinforcement module 140 may embed one or more reinforcement members 30 at least partially within one or more of portions of the tower structure 12. In this regard, the reinforcement module 140 positions reinforcement members 30 at least partially within the tower structure 12. It should be understood that such reinforcement members 30 may extend along the entire height of the tower structure 12 (e.g., as shown in FIG. 2) or along only a portion of the tower height.

According to an exemplary embodiment, as the tower structure 12 is being built up, the additive printing device 40 can alternate between depositing reinforcement members 30 using the reinforcement module 140 and printing the cementitious material 28 using printer heads 42 and nozzles 44. Alternatively, as illustrated in FIGS. 3 and 4, the reinforcement module 140 may be positioned adjacent the printer heads 42 and configured for unwinding or unrolling the reinforcement members 30 or rebar into the print area prior to depositing cementitious material 28 such that the reinforcement members 30 becomes embedded within or printed over with cementitious material 28. Alternatively, the additive printing device 40 may include any other suitable features for compressing or embedding tensioning cable 30 into cementitious material 28 before it has solidified or cured. In alternative embodiments, the additive printing device 40 is configured to eject the cementitious material 28 with short polymer and/or metallic fibers or rings as reinforcements to improve the structural strength of the tower structure 12.

Furthermore, the reinforcement members 30 may generally be configured for ensuring that the stresses in the cementitious material 28, e.g., concrete, may remain largely compressive. Thus, the reinforcement members 30 may be pretensioned in the cementitious material 28 and may be printed around the reinforcement members 30 or the printing process may define holes throughout the tower structure 12 through which the reinforcement members 30 may be placed after curing, and thereafter post-tensioned. In addition, the reinforcement members 30 may be cables, tendons, and/or subsequently grouted into place. In alternative embodiments, the additive printing device 40 may be configured to provide tension to the reinforcement members 30 during printing of the tower structure 12. In such embodiments, additive printing device 40 may vary a tension of the reinforcement members 30 as a function of a cross-section of the tower structure 12 during the printing process. Thus, such reinforcement members 30 are configured to manage tensile stresses of the tower structure 12.

In another embodiment, the tower structure 12 may include, for example, a plurality of reinforcing bars that form a metal mesh (not shown) arranged in a cylindrical configuration to correspond to the shape of the tower structure 12. Further, the cylindrical metal mesh can be embedded into the cementitious material 28 of the tower structure 12 before the material 28 cures and periodically along the height of the tower 12. In addition, the additive printing device 40 is configured to print the cementitious material 28 in a manner that accounts for the cure rate thereof such that the tower wall 20, as it is being formed, can bond to itself. In addition, the additive printing device 40 is configured to print the tower structure 12 in a manner such that it can withstand the weight of the wall 20 as the additively-formed cementitious material 28 can be weak during printing.

In addition, although the description herein refers to the tower structure 12 being printed from a single material, e.g., concrete, it should be appreciated that the tower structure 12 may be printed using any suitable material, even if different from other sections. In addition, the tower structure 12 may have any suitable cross sectional profile. In this regard, as illustrated, the tower structure 12 may be substantially cylindrical or have a circular cross section. However, according to still other embodiments, the tower structure 12 may be polygonal, elliptical, oval, square, teardrop, airfoil, or any other suitable shape. In addition, according to still another embodiment, the tower structure 12 may be tapered or vary in cross-sectional area depending on the vertical position along the tower structure 12.

Referring now to FIG. 6, a block diagram of one embodiment of a controller 190 of the additive printing device 40 is illustrated. As shown, the controller 190 may include one or more processor(s) 192 and associated memory device(s) 194 configured to perform a variety of computer-implemented functions (e.g., performing the methods, steps, calculations and the like and storing relevant data as disclosed herein). Additionally, the controller 190 may also include a communications module 196 to facilitate communications between the controller 190 and the various components of the additive printing device 40. Further, the communications module 196 may include a sensor interface 198 (e.g., one or more analog-to-digital converters) to permit signals transmitted from one or more sensors or feedback devices to be converted into signals that can be understood and processed by the processor(s) 192. It should be appreciated that these sensors and feedback devices may be communicatively coupled to the communications module 196 using any suitable means, e.g., via a wired or wireless connection using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 192 is also configured to compute advanced control algorithms and communicate to a variety of Ethernet or serial-based protocols (Modbus, OPC, CAN, etc.). Additionally, the memory device(s) 194 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 194 may generally be configured to store suitable computer-readable instructions that, when implemented by the processor(s) 192, configure the controller 190 to perform the various functions as described herein.

Referring now to FIG. 7, a flow diagram of one embodiment of a method 200 for manufacturing a tower structure of a wind turbine using an additive printing device is provided. In particular, the method 200 can be used to form the tower structure 12 of the wind turbine 10 using the additive printing device 40, or to form any other suitable tower or tall concrete structure using any other suitable additive printing device. In this regard, for example, the controller 190 may be configured for implementing the method 200. However, it should be appreciated that the exemplary method 200 is discussed herein only to describe exemplary aspects of the present disclosure, and is not intended to be limiting.

Further, though FIG. 7 depicts a control method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the tower structure 12 and the additive printing device 40 as an example, it should be appreciated that these methods may be applied to the operation of additive printing device to form any suitable tower structure.

Furthermore, as described herein, it may be advantageous to incorporate one or more pre-fabricated components into the tower structure 12. Accordingly, the method 200 described herein provides a method for manufacturing a tower structure that incorporates such pre-fabricated component(s) using an additive printing device. In particular, as shown at (202), the method 200 includes providing the additive printing device 40 having at least one printer head 42 arranged atop a support surface. For example, the additive printing device 40 of FIGS. 3-5 can be used to complete the method 200 described herein. Thus, as previously explained, the method 200 may include positioning the vertical support structure 50 above the support surface 15 of the tower structure 12, suspending a support member from the vertical support structure 50 (such as support ring 80), and movably coupling the printer head(s) 42 to the support member.

Referring back to FIG. 7, as shown at (204), the method 200 also includes positioning a pre-fabricated component 90 adjacent to the support surface 15 (see e.g. FIG. 8). In particular, as shown in FIGS. 8 and 9, the pre-fabricated component 90 may be, for example, a pre-fabricated door assembly 92 (FIG. 8) of the tower structure 12 or a pre-fabricated foundation assembly 94 (FIG. 9) of the tower structure 12. Further, as shown, the pre-fabricated component 90 is constructed of a composite material 34 (which may be the same or different than the cementitious material 28 previously described) and is reinforced with a plurality of reinforcement members 30. Thus, as shown, portions 38 of the reinforcement members 30 protrude from the composite material 34.

Accordingly, as shown in FIG. 7 at (206), the method 200 includes printing and depositing, via the printer head(s) 42 of the additive printing device 40, a cementitious material 36 (which may be the same or different than the cementitious material 28 previously described) onto the support surface 15 to build up the tower structure 12 layer by layer around the pre-fabricated component 90. Thus, the portions 38 of the reinforcement members 30 that protrude from the composite material 34 reinforce the cementitious material 36 around the pre-fabricated component 90 once the tower structure 12 is complete and solidified.

Referring now to FIGS. 8 and 9, the pre-fabricated component(s) 90 described herein may include any suitable pre-fabricated component formed in a number of ways. For example, in particular embodiments, as shown in FIG. 8 and as mentioned, the pre-fabricated component 90 may be the pre-fabricated door assembly 92 of the tower structure 12. In particular, as shown in the inset of FIG. 8, the pre-fabricated door assembly 92 has a door frame 93 defining an access opening 95 and a door 97 for moving between an open position that exposes the access opening 95 and a closed position that covers the access opening 95. In such embodiments, as shown in the inset of FIG. 8, the reinforcement members 30 are arranged within the composite material 34 around the access opening 95. More particular, in certain embodiments, as shown, the reinforcement members 30 may be arranged within the composite material 34 at a plurality of different angles with respect to the access opening 95.

Referring now to FIG. 9, as mentioned, the pre-fabricated component 90 may be the pre-fabricated foundation assembly 94. Further, as shown, the pre-fabricated foundation assembly 94 may include a plurality of foundation segments 97. Thus, in certain embodiments, the method 200 may include arranging the plurality of foundation segments 97 together to form a foundation of the tower structure 12. In such embodiments, as shown, a gap 98 exists between each of the plurality of foundation segments 97 with the portions 38 of the reinforcement members 30 protruding from the composite material 34 within the gaps 98.

Furthermore, as mentioned, such pre-fabricated components 90 can be constructed prior to printing the tower structure 12 such that the components 90 can be easily incorporated therein. For example, in an embodiment, the pre-fabricated component 90 may be formed via casting both on or off site. In alternative embodiments, the pre-fabricated component 90 may be formed via the additive printing device 40, i.e. by printing and depositing the composite material 34 via the printer head(s) 42 to form the pre-fabricated component 90 prior to positioning the component 90 adjacent to the support surface 15 of the tower structure 12 for printing remaining portions of the structure 12.

In one embodiment, as shown in FIGS. 10-12, the method 200 may include vertically printing and depositing the composite material 34 via the printer head(s) 42 to form the pre-fabricated component 90. In such embodiments, as shown in FIG. 12 as an example, the printer head(s) 42 may vertically print and deposit the composite material 34 through a pathway having an inlet 101 such that the composite material 34 flows vertically down and through the pathway defined by one or more baffles 103. In addition, as shown in FIG. 12, the pathway may also include a vent 105 to assist with the flow of the composite material 34 therethrough.

Furthermore, as shown in FIG. 11, one or more of the layers 107 of the pre-fabricated component 90 may be formed to include one or more holes 99. Thus, in such embodiments, as shown in FIG. 10, the method 200 may further include placing at least one of the plurality of reinforcement members 30 within each of the plurality of holes to reinforce the pre-fabricated component 90. In certain embodiments, the printer head(s) 42 may vertically print and deposit the composite material 34 to form the pre-fabricated component 90 off site, in which case the reinforcement member(s) 30 may be placed within the holes 99 to reinforce the pre-fabricated component 90 onsite. Accordingly, the pre-fabricated component 90 without the reinforcement member(s) 30 can be more easily transported onsite (e.g. because it is lighter and does not have the protruding reinforcement member(s) 30), at which time the reinforcement member(s) 30 can be added thereto.

Still referring to FIG. 11, in particular embodiments, the method 200 may further include placing a grommet 109 in each of the plurality of holes 99 prior to placing the reinforcement members 30 within the holes 99. In such embodiments, the grommets 109 (e.g. which may be formed of a flexible material such as rubber or a metal material such as steel) at least partially fill the holes 99 and surround the reinforcement member(s) 30 so as to prevent leakage.

Referring now to FIGS. 13 and 14, the method 200 may include horizontally printing and depositing the composite material 34 via the printer head(s) 42 to form the pre-fabricated component 90. As used herein, horizontal printing generally refers to the printer head(s) 42 printing the layers 107 in the thickness direction. In such embodiments, as shown particularly in FIG. 14, the method 200 may include placing at least one of the reinforcement members 30 between layers 107 of the pre-fabricated component 90 as the pre-fabricated component 90 is being horizontally printed and deposited. Moreover, in such embodiments, as shown in FIG. 13, the printer head(s) 42 may print the composite material 34 to form dovetail features 111 (e.g. around a perimeter of the door frame 93).

Further aspects of the invention are provided by the subject matter of the following clauses:

Clause 1. A method of manufacturing a tower structure, the method comprising:

providing an additive printing device having at least one printer head atop a support surface;

positioning a pre-fabricated component adjacent to the support surface, the pre-fabricated component being constructed of a composite material reinforced with a plurality of reinforcement members, wherein portions of the plurality of reinforcement members protrude from the composite material; and printing and depositing, via the at least one printer head, a cementitious material onto the support surface to build up the tower structure layer by layer around the pre-fabricated component, wherein the portions of the plurality of reinforcement members that protrude from the composite material reinforce the cementitious material around the pre-fabricated component.

Clause 2. The method of clause 1, wherein providing the additive printing device having the at least one printer head atop a support surface of the tower structure further comprises:

positioning a vertical support structure above the support surface of the tower structure;

suspending a support member from the vertical support structure; and movably coupling the at least one printer head to the support member.

Clause 3. The method of any of the preceding clauses, wherein the pre-fabricated component comprises at least one of a pre-fabricated door assembly or a pre-fabricated foundation assembly.

Clause 4. The method of clause 3, wherein the pre-fabricated door assembly comprises a door frame defining an access opening and a door for moving between an open position that exposes the access opening and a closed position that covers the access opening.

Clause 5. The method of clause 4, wherein the plurality of reinforcement members are arranged within the composite material around the access opening.

Clause 6. The method of clause 5, wherein the plurality of reinforcement members are arranged within the composite material at a plurality of different angles with respect to the access opening.

Clause 7. The method of clause 3, wherein the pre-fabricated foundation assembly further comprises a plurality of foundation segments, the method further comprising:

arranging the plurality of foundation segments together to form a foundation of the tower structure, wherein a gap exists between each of the plurality of foundation segments with the portions of the plurality of reinforcement members protruding from the composite material within the gaps.

Clause 8. The method of any of the preceding clauses, further comprising constructing the pre-fabricated component via pre-casting the composite material to form the pre-fabricated component off site.

Clause 9. The method of any of the preceding clauses, further comprising constructing the pre-fabricated component via casting the composite material to form the pre-fabricated component on site prior to positioning the pre-fabricated component adjacent to the support surface of the tower structure.

Clause 10. The method of any of the preceding clauses, further comprising constructing the pre-fabricated component by printing and depositing the composite material via the at least one printer head to form the pre-fabricated component prior to positioning the pre-fabricated component adjacent to the support surface of the tower structure.

Clause 11. The method of clause 10, further comprising vertically printing and depositing the composite material via the at least one printer head to form the pre-fabricated component.

Clause 12. The method of clause 11, wherein vertically printing and depositing the composite material via the at least one printer head to form the pre-fabricated component on site further comprises:

vertically printing and depositing the composite material via the at least one printer head to form the pre-fabricated component with a plurality of holes formed therein; and placing at least one of the plurality of reinforcement members within each of the plurality of holes to reinforce the pre-fabricated component.

Clause 13. The method of clause 12, further comprising vertically printing and depositing the composite material via the at least one printer head to form the pre-fabricated component off site and placing at least one of the plurality of reinforcement members within each of the plurality of holes to reinforce the pre-fabricated component onsite.

Clause 14. The method of clause 12, further comprising placing a grommet in each of the plurality of holes prior to placing at least one of the plurality of reinforcement members within each of the plurality of holes.

Clause 15. The method of clause 10, further comprising horizontally printing and depositing the composite material via the at least one printer head to form the pre-fabricated component.

Clause 16. The method of clause 15, further comprising placing at least one of the plurality of reinforcement members between layers of the pre-fabricated component as the pre-fabricated component is being horizontally printed and deposited.

Clause 17. The method of any of the preceding clauses, wherein the composite material comprises at least one of a polymer, concrete, pitch resin, asphalt, clay, cement, mortar, or a cementitious composition, and wherein and the cementitious material comprises at least one of concrete, pitch resin, asphalt, clay, cement, mortar, or a cementitious composition.

Clause 18. The method of any of the preceding clauses, wherein the tower structure is part of a wind turbine.

Clause 19. A method of manufacturing a tower structure, the method comprising:

printing and depositing, via at least one printer head, a composite material to build up a pre-fabricated component layer by layer;

reinforcing the cementitious material with a plurality of reinforcement members such that portions of the plurality of reinforcement members protrude from the composite material; and incorporating the pre-fabricated component into a cementitious material to form the tower structure, wherein the portions of the plurality of reinforcement members that protrude from the composite material reinforce the cementitious material around the pre-fabricated component.

Clause 20. The method of clause 19, wherein incorporating the pre-fabricated component into the cementitious material to form the tower structure further comprises:

positioning the pre-fabricated component atop a support surface; and printing and depositing, via the at least one printer head, the cementitious material onto the support surface to build up the tower structure layer by layer around the pre-fabricated component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a tower structure, the method comprising:
    providing an additive printing device having at least one printer head atop a support surface;
    positioning a pre-fabricated component adjacent to the support surface, the pre-fabricated component being constructed of a composite material reinforced with a plurality of reinforcement members, wherein portions of the plurality of reinforcement members protrude from the composite material, the pre-fabricated component comprising at least one of a pre-fabricated door assembly or a pre-fabricated foundation assembly; and
    printing and depositing, via the at least one printer head, a cementitious material onto the support surface to build up the tower structure layer by layer around the pre-fabricated component, wherein the portions of the plurality of reinforcement members that protrude from the composite material reinforce the cementitious material around the pre-fabricated component.

2. The method of claim 1, wherein providing the additive printing device having the at least one printer head atop a support surface of the tower structure further comprises:
    positioning a vertical support structure above the support surface of the tower structure;
    suspending a support member from the vertical support structure; and
    movably coupling the at least one printer head to the support member.

3. The method of claim 1, wherein the pre-fabricated door assembly comprises a door frame defining an access opening and a door for moving between an open position that exposes the access opening and a closed position that covers the access opening.

4. The method of claim 3, wherein the plurality of reinforcement members are arranged within the composite material around the access opening.

5. The method of claim 4, wherein the plurality of reinforcement members are arranged within the composite material at a plurality of different angles with respect to the access opening.

6. The method of claim 1, wherein the pre-fabricated foundation assembly further comprises a plurality of foundation segments, the method further comprising:
    arranging the plurality of foundation segments together to form a foundation of the tower structure, wherein a gap exists between each of the plurality of foundation segments with the portions of the plurality of reinforcement members protruding from the composite material within the gaps.

7. The method of claim 1, further comprising constructing the pre-fabricated component via pre-casting the composite material to form the pre-fabricated component off site.

8. The method of claim 1, further comprising constructing the pre-fabricated component via casting the composite material to form the pre-fabricated component on site prior to positioning the pre-fabricated component adjacent to the support surface of the tower structure.

9. The method of claim 1, further comprising constructing the pre-fabricated component by printing and depositing the composite material via the at least one printer head to form the pre-fabricated component prior to positioning the pre-fabricated component adjacent to the support surface of the tower structure.

10. The method of claim 9, further comprising vertically printing and depositing the composite material via the at least one printer head to form the pre-fabricated component.

11. The method of claim 10, wherein vertically printing and depositing the composite material via the at least one printer head to form the pre-fabricated component on site further comprises:
    vertically printing and depositing the composite material via the at least one printer head to form the pre-fabricated component with a plurality of holes formed therein; and
    placing at least one of the plurality of reinforcement members within each of the plurality of holes to reinforce the pre-fabricated component.

12. The method of claim 11, further comprising vertically printing and depositing the composite material via the at least one printer head to form the pre-fabricated component off site and placing at least one of the plurality of reinforcement members within each of the plurality of holes to reinforce the pre-fabricated component onsite.

13. The method of claim 11, further comprising placing a grommet in each of the plurality of holes prior to placing at least one of the plurality of reinforcement members within each of the plurality of holes.

14. The method of claim 9, further comprising horizontally printing and depositing the composite material via the at least one printer head to form the pre-fabricated component.

15. The method of claim 14, further comprising placing at least one of the plurality of reinforcement members between layers of the pre-fabricated component as the pre-fabricated component is being horizontally printed and deposited.

16. The method of claim 1, wherein the composite material comprises at least one of a polymer, concrete, pitch resin, asphalt, clay, cement, mortar, or a cementitious composition, and wherein and the cementitious material comprises at least one of concrete, pitch resin, asphalt, clay, cement, mortar, or a cementitious composition.

17. The method of claim 1, wherein the tower structure is part of a wind turbine.

* * * * *